United States Patent
Luo et al.

(10) Patent No.: US 8,755,391 B2
(45) Date of Patent: Jun. 17, 2014

(54) METHOD AND DEVICE FOR OPERATING AT LEAST TWO RADIO ACCESS TECHNOLOGIES AND COMMUNICATION SYSTEM COMPRISING SUCH DEVICE

(75) Inventors: Jijun Luo, München (DE); Egon Schulz, München (DE); Wolfgang Zirwas, München (DE)

(73) Assignee: Nokia Siemens Networks Oy, Espoo (FI)

( * ) Notice: Subject to any disclaimer, the term of this patent is extended or adjusted under 35 U.S.C. 154(b) by 970 days.

(21) Appl. No.: 12/676,018

(22) PCT Filed: Aug. 26, 2008

(86) PCT No.: PCT/EP2008/061144
§ 371 (c)(1),
(2), (4) Date: Apr. 19, 2010

(87) PCT Pub. No.: WO2009/030607
PCT Pub. Date: Mar. 12, 2009

(65) Prior Publication Data
US 2010/0202379 A1      Aug. 12, 2010

(30) Foreign Application Priority Data

Sep. 4, 2007 (EP) .................................... 07017324

(51) Int. Cl.
*H04L 12/28* (2006.01)
*H04W 74/02* (2009.01)
*H04W 16/06* (2009.01)
*H04L 27/26* (2006.01)
*H04L 12/56* (2006.01)
*H04W 4/00* (2009.01)
*H04W 88/10* (2009.01)
*H04L 27/00* (2006.01)

(52) U.S. Cl.
CPC .............. *H04W 74/02* (2013.01); *H04W 16/06* (2013.01); *H04W 88/10* (2013.01); *H04L 27/2602* (2013.01); *H04L 27/0008* (2013.01)
USPC ........................................ 370/395.5; 370/330

(58) Field of Classification Search
None
See application file for complete search history.

(56) References Cited

U.S. PATENT DOCUMENTS

| | | | |
|---|---|---|---|
| 6,130,886 A | 10/2000 | Ketseoglou et al. | 370/347 |
| 2006/0002323 A1 | 1/2006 | Hildebrand et al. | 370/321 |
| 2008/0095195 A1* | 4/2008 | Ahmadi et al. | 370/478 |
| 2009/0067377 A1* | 3/2009 | Talukdar et al. | 370/329 |

FOREIGN PATENT DOCUMENTS

WO     WO 2006/124336 A2     11/2006

* cited by examiner

*Primary Examiner* — Ayaz Sheikh
*Assistant Examiner* — Sori Aga
(74) *Attorney, Agent, or Firm* — Harrington & Smith

(57) ABSTRACT

A method and a device are provided for operating at least a first radio access technology and a second radio access technology, the method including the step of: a hybrid radio frame is provided including elements of the first radio access technology and of the second radio access technology.

20 Claims, 2 Drawing Sheets

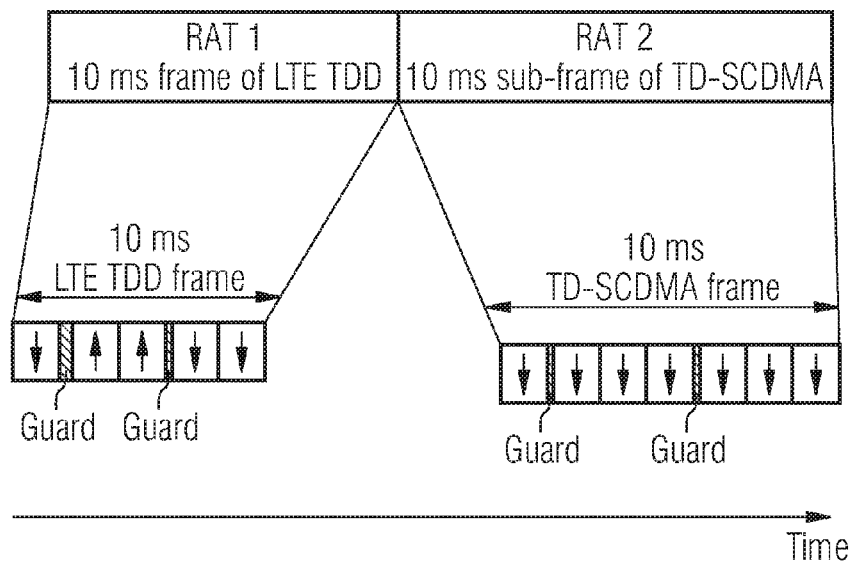
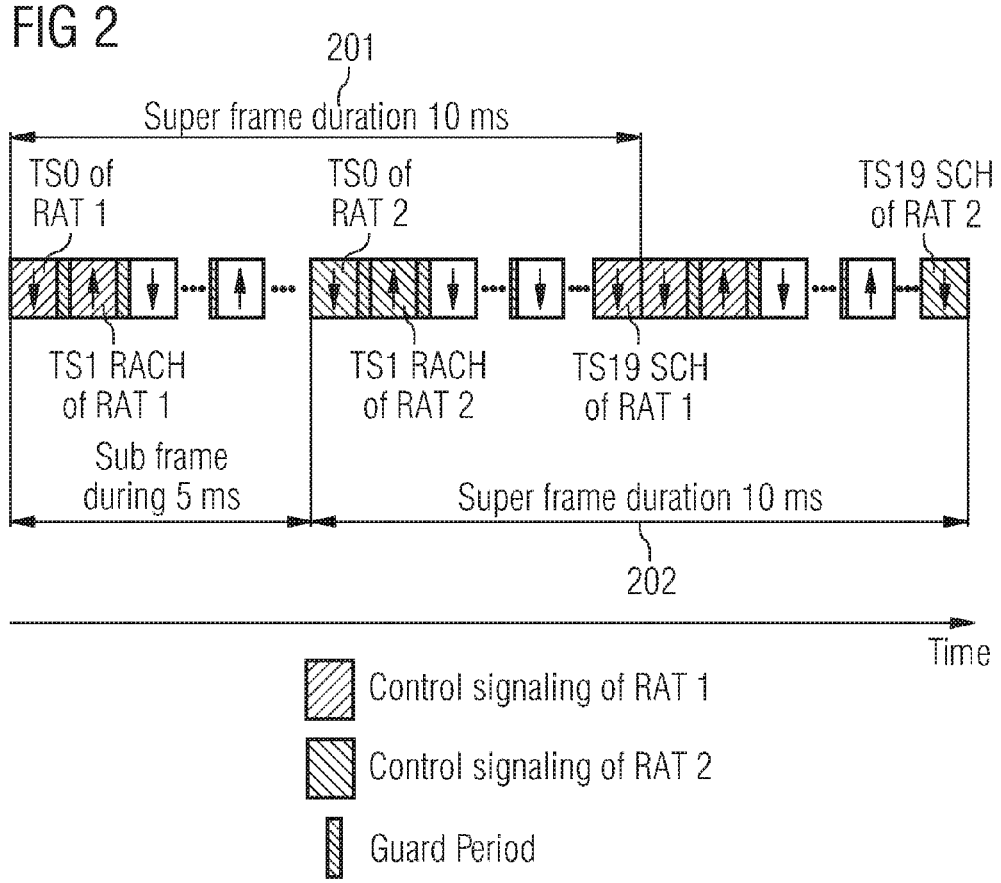

☒ Control signaling of RAT 1

☒ Control signaling of RAT 2

METHOD AND DEVICE FOR OPERATING AT LEAST TWO RADIO ACCESS TECHNOLOGIES AND COMMUNICATION SYSTEM COMPRISING SUCH DEVICE

The invention relates to a method and to a device for operating at least two radio access technologies and to a communication system comprising such a device.

Telecommunication systems are experiencing fast and fundamental changes due to various emerging standards. As a result thereof, there will be a significant number of Radio Access Technologies (RATs) within the same deployment area showing a high degree of heterogeneous features of the communication system.

Given by such a heterogeneity, in particular of future wireless systems, considerable amounts of the frequency range will be required for systems or technologies of the same kind, e.g., the IMT-2000 family.

On the other hand, as a wide range of terminals requires rather old standards, e.g., TD-SCDMA, the operator cannot simply replace an old standard by its evolved one, e.g., by LTE TDD (Long Term Evolution Time Division Duplex), in particular as the air interface of LTE TDD is not backwards-compatible to TD-SCDMA. Hence, a smooth migration to evolved systems requires some compatibility with existing devices, in particular with former radio access technologies.

The problem to be solved is to overcome the disadvantages as stated above and to provide an approach that allows various radio access technologies to be used in an efficient way, e.g., by a single operator. Hence, this approach allows to efficiently utilize a considerably narrow spectrum band.

This problem is solved according to the features of the independent claims. Further embodiments result from the depending claims.

In order to overcome this problem, a method is provided for operating at least a first radio access technology and a second radio access technology, the method comprising the following step:
 a hybrid radio frame is provided comprising elements of the first radio access technology and of the second radio access technology.

Said elements may be related to at least a portion of information according to the first and/or second radio access technology. In particular, the elements comprise at least a frame and/or a sub-frame according to the first radio access technology and according to the second radio access technology.

The hybrid radio frame is in particular a piece of information comprising and/or combining elements according to the first radio access technology and according to the second radio access technology.

It is to be noted that more than two access technologies can be combined by said hybrid radio frame.

The approach presented advantageously allows utilizing different standards that may use the same bandwidth and may be operated at the same carrier frequency.

Another advantage of this concept is that an operator utilizing a narrow spectrum band is hence able to efficiently operate various radio access technologies simultaneously and may provide services based on evolved radio access technologies as well as legacy access technologies. This further enables a backward compatibility thereby supporting terminals of previous model generations.

The hybrid radio frame can in particular be sent to (mobile) terminals thereby providing services of the first radio access technology as well as of the second access technology to (mobile) terminals that are compatible with either access technology (or both).

In an embodiment, the hybrid radio frame comprises super frames of the first radio access technology and super frames of the second radio access technology.

It is to be noted that super frames in particular comprise control data, synchronization data and user data for or associated with a particular radio access technology.

Further, the super frame as used herein may be a frame or a portion of a frame of a radio access technology.

The hybrid radio frame may in particular comprise selected elements of the (super) frame, in particular elements related to the control signaling and/or to (scheduled) user data.

In another embodiment, the hybrid radio frame comprises super frames of the first radio access technology and of the second radio access technology, wherein the super frame of the first radio access technology comprises elements and/or information of the second radio access technology.

Hence, this approach allows to efficiently utilize a bandwidth or spectrum available by—at least partially—using the body of a super frame of the first radio access technology by the second radio access technology.

Such an approach allows to combine several radio access technologies by mixing their the contents of their (super) frames. It is in particular useful to intermesh super frames such that control information required by each separate radio access technology is provided at the same spot (time or frequency) where it is expected by a terminal for, e.g., synchronization purposes.

In a further embodiment, a portion of each super frame comprises control information for the access technology to which this super frame is associated.

In a next embodiment, a starting point of the super frame of the second radio access technology is flexibly set within the first super frame of the first radio access technology, wherein in particular an overlap between control information of both radio access technologies is avoided.

Hence, the control information may be located within the body of a super frame such that it does not interfere with a control information of another radio access technology.

It is also an embodiment that a System Information Block (SIB) is provided indicating the hybrid frame structure to an addressee. Preferably, the addressee is a terminal, in particular a mobile terminal.

Such System Information Block (SIB) can be used by the addressee to analyze (in advance) the information provided, i.e., the addressee then knows where which piece of information related to which radio access technology is provided and the addressee may further utilize such knowledge by "listening" (receiving, synchronizing) only to portions of the information provided that is destined to itself (e.g., its radio access technology).

Pursuant to another embodiment, the addressee analyses the System Information Block and at least partially ignores information that is not provided for itself.

According to an embodiment, the hybrid radio frame utilizes the time domain and/or the frequency domain.

Besides the time domain, the hybrid radio frame may utilize a spectrum, i.e., a frequency domain for provisioning at least a portion of the at least two radio access technologies.

The problem stated supra is also solved by a device for operating at least two radio access technologies comprising a processor unit that is equipped/arranged such that the method as described herein is executable on said processor unit.

According to an embodiment, said device is a communication device, in particular a network element. The functionality of said device can be provided within a network element, in particular a network node or a base station. In particular, such device may provide the hybrid radio frame as described herein towards its subscribers and/or terminals, in particular to mobile terminals.

The problem stated above is also solved by a communication system comprising the device as described herein.

Embodiments of the invention are shown and illustrated in the following figures:

FIG. 1 shows super frames of two radio access technologies that are multiplexed separately in a time domain;

FIG. 2 shows super frames of two radio access technologies that are meshed with one another, wherein control information or control signaling indicates the beginning and the end of a super frame of a particular radio access technology;

Figure 3:
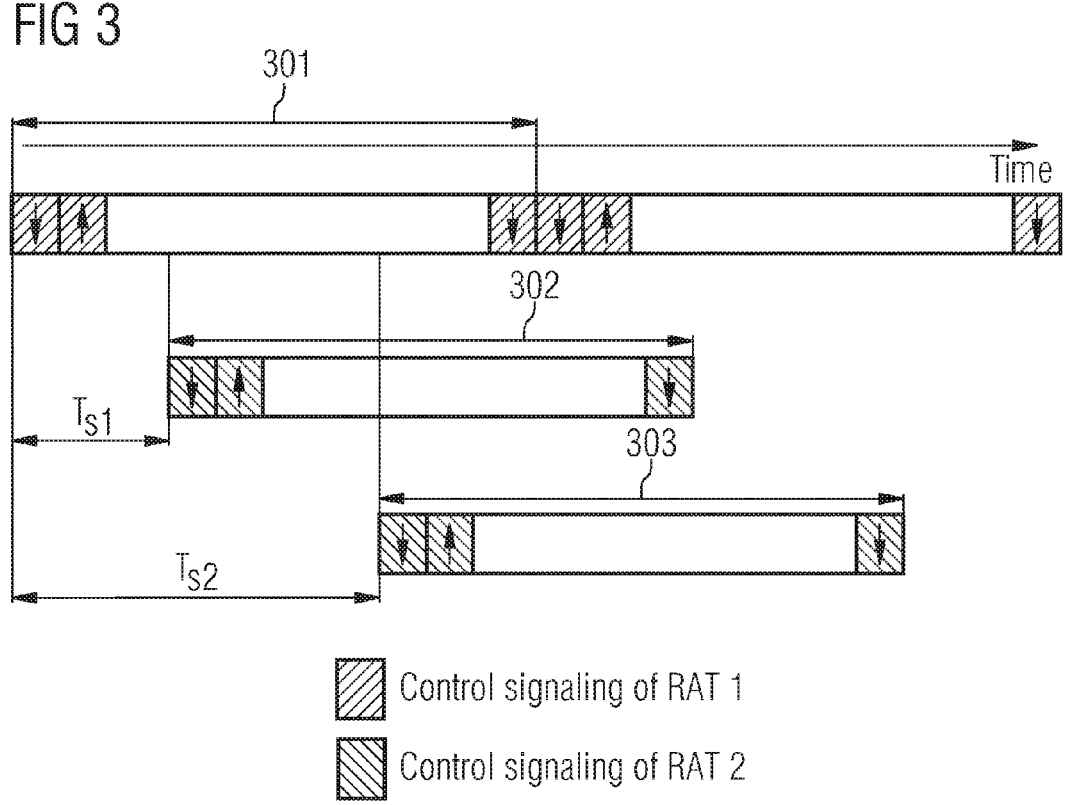
FIG. 3 shows a dynamic shifting of starting points of a super frame of the first radio access technology in view of the starting point of the super frame associated with the second radio access technology.

The approach provided suggests a hybrid radio frame structure and in particular a dynamic resource allocation scheme in order to enable a smooth system migration or simultaneous operation of heterogeneous systems.

A radio frame is designed or used to carry various kinds of information, in particular:
  system information;
  control information; and
  user data information
for multi-radio interfaces, respectively.

The radio frame is referred to as hybrid radio frame in particular as it carries composite protocols supporting, e.g., multiple air interfaces.

Particularly, there are two levels of hybrid radio frames. A selection of a hybrid level may depend on at least one of the following criteria:
  A deployment environment, i.e., a mobility feature;
  A common factor and a scalability of radio frame in a legacy standard; and
  A usage of scrambling codes.

The hybrid level of hybrid radio frames may be controlled by an Operation and Maintenance (O&M) subsystem using the knowledge of at least one of the variables as mentioned before.

The change rate of the hybrid level may preferably be low in case the location of the common control channel in the radio frame has to be changed, e.g., the change rate may be designed to lie within hours, in order to avoid unnecessary call drops or loss of synchronization.

However, in order to maintain a trunking gain, when the location of common control channels belonging to different systems is fixed, the channel assignment to the terminals supporting different standards may be as flexible as possible.

Hybrid Radio Frame at the Super Frame Level

This embodiment of a hybrid level considers in particular a concatenation of radio frames of different radio access technologies (RATs), e.g., TD-SCDMA and LTE TDD.

Such two radio access technologies (according to this particular example) are operated at the same carrier frequency, and RAT specific radio frames are time multiplexed as shown in FIG. 1.

According to the example given in FIG. 1, a first radio access technology RAT1 is based on 10 ms frames according to LTE TDD and a second radio access technology RAT2 is based on 10 ms frames according to TD-SCDMA. Each box shows a portion of information, which is either conveyed in uplink direction (e.g., from a mobile terminal towards a base station) or vice versa in downlink direction—indicated by the arrow inside the respective box.

Guard periods are inserted between boxes in order to avoid interference.

The concatenation pattern shown in FIG. 1 is flexible. The frames of different radio access technologies can be arranged, e.g., as follows:
  RAT1-RAT2-RAT1-RAT2- . . .
  RAT1-RAT1-RAT2-RAT2- . . .
  RAT1-RAT2-RAT2-RAT1-RAT2-RAT2- . . .

The sequence can be non-uniform, e.g., allowing RAT2 appear once after two times of RAT1 or the like.

It is to be noted that several radio access technologies can be arranged within a hybrid radio frame, e.g., RAT1, RAT2 and RAT3, etc., wherein each of the radio access technology can be arranged according to a separate pattern within the hybrid radio frame.

Such flexibility in particular allows a matching between available terminal capabilities or to arrange several different radio access technologies within a hybrid frame that may meet the requirements and demands and in particular the traffic provided by different (mobile) terminals of various such radio access technologies.

Hybrid Radio Frame at a Sub-Frame and/or Time-Slot Level

To further improve, e.g., a delay, an alternative solution is presented in FIG. 2.

FIG. 2 shows a sub-frame level radio frame integration comprising two super frames 201 and 202. In the example of FIG. 2, each super frame 201 and 202 has a duration of 10 ms and may be associated with a different radio access technology RAT1, RAT2. The super frames 201 and 202 are intermeshed, wherein at the beginning and at the end of the time interval corresponding to super frame 201 control information for the radio access technology RAT1 is provided (see TS0, TS1 of RAT1 and TS19 of RAT1). The same applies to super frame 202 that is associated with the radio access technology RAT2, however it starts somewhere inside the time interval of super frame 201 (associated with RAT1). The control information for super frame 202 indicates the start and the end of such super frame 202 (i.e. TS0 and TS1 of RAT2 and TS19 of RAT2).

However, as long as the beginning and the end of a super frame can be indicated by the control information (such control information being required for the mobile terminal in order to recognize its RAT super frame), the body of each super frame may be at least partially utilized for at least one further radio access technology.

According to FIG. 2, the hybrid radio frame is structured along a time axis "Time" as follows:
  TS0: Common control of RAT1;
  TS1: Uplink random access channel of RAT1;
  Data channel and the access control channels (in this period, different RAT data can be conveyed);
  Synchronization channel of RAT2.

In an area around the middle of the super frame 201 for RAT1, i.e., at the beginning of the super frame 202 of RAT2, the common control information of the second RAT starts:
  TS0: Common control of RAT2;
  TS1: Uplink random access channel of RAT2;
  Data channel and the access control channels (in this period, different RAT data is allowed to be carried);
  Synchronization channel of RAT1.

The time shift T between the starting point of the first radio access technology RAT1 and the second radio access technology RAT2 can be determined in particular by avoiding an overlapping of common control channels.

FIG. 3 shows dynamic shifting of starting points of a super frame 301 of a first radio access technology and super frames 302 and 303 of a second radio access technology within a hybrid radio frame.

The time shift of the second RAT radio frame varies from Ts1 (for super frame 302) to Ts2 (for super frame 303).

One solution as how to determine an advantageous time shift is as follows:

$$Ts1 + n\, Ts \text{ with } n = 0, 1, \ldots, N$$

$$NTs + Ts1 \leq Ts2$$

$$\text{Mod}(Ts, Ts1) = 0$$

with Ts being the time slot duration, i.e., the basic time shift scalability.

The guard period is not considered in this formula, but may be taken into account for system design.

System Information Block (SIB)

A SIB can be used in order to indicate a hybrid level in particular for up-to-date single mode terminals as well as for multi-mode terminal.

Hence, terminals enabling different classes or capabilities may benefit from such integration.

For example, a single mode terminal may be arranged such that it reads (further) SIBs that indicate the structure of the hybrid radio frame used as well as a relevant active time period for the RAT supported by this particular terminal. Hence, the terminal may enter a sleep mode or it may simply ignore a signal related to super frames that are associated with a different RAT. In other words, the terminal is able to identify frames that are destined for this terminal and it may not decode or synchronize on information that is different from its own RAT.

Furthermore, a multi-mode terminal may be capable of several RATs, in particular at the same time. Such a multi-mode terminal may receive and decode signals from multiple RATs and it may be connected to different RATs at the same time. In such case, a trunking gain can be obtained from the support of multimode terminal transmission.

For such a scenario, reserved fields in the SIB of each RAT may indicate the existence of another RAT as well as the time shift of the common control or the synchronization channel in order to avoid non-necessary cell search for the terminals.

Designing the Hybrid Radio Frame

The following guidelines may be considered when setting up the hybrid radio frame:

Fitting of radio frames of different RATs is primarily based on a common factor (e.g., a duration of the (sub)frame). A particular objective may be directed to not lose efficiency due to non-used resources.

Collision between the common channels (including broadcasting, random access channels, common pilot channel) among RATs shall be avoided.

Shorter radio frames of first RAT shall be inserted into a longer radio frame of another RAT.

The less flexible RAT shall build a base system, other more flexible systems may be utilized as secondary system to be adjusted on the available degree of freedom provided by the primary system. For instance, 802.16e supports other timeframe values (2 ms, 2.5 ms, 4 ms, 8 ms, 10 ms, 12 ms, and 20 ms).

A flexible approach is that the frames are transmitted intermittently, e.g., shifted by a suitable number of time slots. Hence, broadcast channel (BCH), pilot signals and other control messages can be sent on mutually orthogonal resources for RAT1 and RAT2, whereas the rest of the frame can be used by any of the RATs, depending on the actual user traffic demand.

Instead of time shifts, different frequency sub-bands might be used as well. Some standards like 3GPP LTE provide broadcasting control information indicating the position of further control channels in time and frequency direction. This allows to put the control signals of each RAT to any suitable location within the radio frame.

Further Advantages:

The approach suggested may be implemented in commercial systems which have a common factor of radio frame duration time and ideally also identical slot time duration.

Further advantages are in particular as follows:

Fast deployment of evolved, emerging or legacy systems in combination with already deployed systems;

Smooth network migration;

Backward compatibility;

High trunking gain for multi-mode terminals or between differently loaded RATs;

Flexible frame structure setting according to terminal capabilities.

Figure 4:
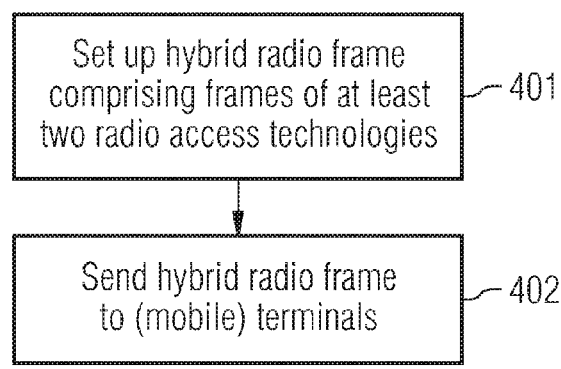
FIG. 4 shows steps of a method for operating at least two radio access technologies.

FIG. 4 shows steps of a method for operating at least two radio access technologies.

In a step 401 a hybrid radio frame is set up, said hybrid radio frame comprising frames of at least two radio access technologies. In a step 402 the hybrid radio frame is sent towards at least one (mobile) terminal.

The invention claimed is:

1. A method for operating at least a first radio access technology and a second radio access technology in a communication system, the method comprising:
   a network node providing a mobile terminal with a hybrid radio frame, the hybrid radio frame comprising elements of the first radio access technology and elements of the second radio access technology;
   wherein the hybrid radio frame comprises super frames of the first radio access technology and super frames of the second radio access technology;
   wherein at least one first super frame of the super frames of the first radio access technology also comprises elements of the second radio access technology; and
   wherein a starting point of at least one second super frame of the super frames of the second radio access technology is flexibly set within the at least one first super frame of the first radio access technology by determining a varying time shift between the starting point of the at least one second super frame of the second radio access technology, and a starting point of the at least one first super frame of the first radio access technology, wherein the starting point of the at least one second super frame of the second radio access technology begins in an area around the middle of the at least one first super frame of the first radio access technology, in order to avoid an overlap between control information of both the first and the second radio access technologies.

2. The method according to claim 1, wherein a portion of each super frame comprises control information for the access technology to which this super frame is associated.

3. The method according to claim 1, wherein a System Information Block is provided indicating the hybrid frame structure to an addressee.

4. The method according to claim 3, wherein the addressee is a terminal, in particular a mobile terminal.

5. The method according to claim 3, wherein the addressee analyses the System Information Block and at least partially ignores information that is not provided for itself.

6. The method according to claim 1, wherein the hybrid radio frame utilizes the time domain and/or the frequency domain.

7. A device for operating at least two radio access technologies comprising a processor unit that is equipped/arranged such that the method according of claim 1 is executable on said processor.

8. The device according to claim 7, wherein said device is a communication device, in particular a network element.

9. An apparatus comprising one or more processors and one or more memories including computer program code, the one or more memories and the computer program code being configured, with the one or more processors, to cause the apparatus to operate at least a first radio access technology and a second radio access technology in a communication system by performing at least the following:
- a network node providing a mobile terminal with a hybrid radio frame, the hybrid radio frame comprising elements of the first radio access technology and elements of the second radio access technology;
- wherein the hybrid radio frame comprises super frames of the first radio access technology and super frames of the second radio access technology;
- wherein at least one first super frame of the super frames of the first radio access technology also comprises elements of the second radio access technology; and
- wherein a starting point of at least one second super frame of the super frames of the second radio access technology is flexibly set within the at least one first super frame of the first radio access technology by determining a varying time shift between the starting point of the at least one second super frame of the second radio access technology, and a starting point of the at least one first super frame of the first radio access technology, wherein the starting point of the at least one second super frame of the second radio access technology begins in an area around the middle of the at least one first super frame of the first radio access technology, in order to avoid an overlap between control information of both the first and the second radio access technologies.

10. The apparatus according to claim 9, wherein a portion of each super frame comprises control information for the access technology to which this super frame is associated.

11. The apparatus according to claim 9, wherein a System Information Block is provided indicating the hybrid frame structure to an addressee.

12. The apparatus according to claim 11, wherein the addressee is a terminal, in particular a mobile terminal.

13. The apparatus according to claim 11, wherein the addressee analyses the System Information Block and at least partially ignores information that is not provided for itself.

14. The apparatus according to claim 9, wherein the hybrid radio frame utilizes the time domain and/or the frequency domain.

15. A computer program product comprising a non-transitory computer-readable medium bearing computer program code embodied thereon for use with a computer, the computer program code comprising instructions for performing at least the following:
- a network node providing a mobile terminal with a hybrid radio frame, the hybrid radio frame comprising elements of the first radio access technology and elements of the second radio access technology;
- wherein the hybrid radio frame comprises super frames of the first radio access technology and super frames of the second radio access technology;
- wherein at least one first super frame of the super frames of the first radio access technology also comprises elements of the second radio access technology; and
- wherein a starting point of at least one second super frame of the super frames of the second radio access technology is flexibly set within the at least one first super frame of the first radio access technology by determining a varying time shift between the starting point of the at least one second super frame of the second radio access technology, and a starting point of the at least one first super frame of the first radio access technology, wherein the starting point of the at least one second super frame of the second radio access technology begins in an area around the middle of the at least one first super frame of the first radio access technology, in order to avoid an overlap between control information of both the first and the second radio access technologies.

16. The computer program product according to claim 15, wherein a portion of each super frame comprises control information for the access technology to which this super frame is associated.

17. The computer program product according to claim 15, wherein a System Information Block is provided indicating the hybrid frame structure to an addressee.

18. The computer program product according to claim 17, wherein the addressee is a terminal, in particular a mobile terminal.

19. The computer program product according to claim 17, wherein the addressee analyses the System Information Block and at least partially ignores information that is not provided for itself.

20. The computer program product according to claim 15, wherein the hybrid radio frame utilizes the time domain and/or the frequency domain.

* * * * *